United States Patent [19]

Appleman

[11] 4,169,162
[45] Sep. 25, 1979

[54] SOFT-MOIST ANIMAL FOOD

[75] Inventor: Milo D. Appleman, Los Angeles, Calif.

[73] Assignee: Daylin, Inc., Los Angeles, Calif.

[21] Appl. No.: 898,164

[22] Filed: Apr. 20, 1978

[51] Int. Cl.² ............................................. A23K 1/10
[52] U.S. Cl. .................................. 426/335; 426/521; 426/532; 426/623; 426/630; 426/635; 426/658; 426/657
[58] Field of Search .............. 426/521, 335, 635, 657, 426/658, 656, 532, 805, 807, 332, 630, 623

[56] References Cited

U.S. PATENT DOCUMENTS

| | | | |
|---|---|---|---|
| 3,901,976 | 8/1975 | Roth et al. | 426/69 |
| 3,974,296 | 8/1976 | Burkwall | 426/805 |
| 3,985,904 | 10/1976 | Bernotavicz | 426/332 |
| 4,011,346 | 3/1977 | Ernst | 426/332 X |
| 4,062,988 | 12/1977 | De Santis | 426/807 X |

*Primary Examiner*—R. B. Penland
*Attorney, Agent, or Firm*—Donald Diamond

[57] ABSTRACT

A soft-moist, heat treated, environmentally stable animal food product having a moisture content from about 40 to about 60 wt.% and a pH from about 4 to about 6 is prepared by emulsifying and pasteurizing an ingredient mix containing moist proteinaceous meaty material, added moisture, edible acid, antimicrobial material, proteinaceous vegetable material, and colloidal clay. This ingredient mix may be further formulated with protein supplement material, fatty material, cellulosic binder, amylaceous material, vitamins and minerals, palatability enhancing material,s and other nutritionally balancing ingredients. The products are particularly suited for feeding carnivorous and omnivorous animals housed in zoos.

24 Claims, No Drawings

SOFT-MOIST ANIMAL FOOD

BACKGROUND OF THE INVENTION

This invention relates to animal food products and, more particularly, to soft-moist, heat treated, environmentally stable animal food products. While the animal food products of this invention can be used to feed diverse animals under varying circumstances, they are specially suited for use in feeding carnivorous and omnivorous animals housed in zoos.

Heretofore, it has been customary to feed carnivorous zoo animals with carcass and/or organ meat derived from appropriate meat sources butchered at the zoo or elsewhere and sprinkled with suitable amounts of salts, vitamins and other ingredients including trace minerals so that the food is nutritionally complete for the animals. The butchering of the animals and even the handling of the carcass and organ meat can be characterized as being a "messy" endeavor. In addition, there is frequently an uneven distribution of the proper amount of minerals and vitamins on the meat pieces being fed to the animals. Also, carcass meat, which contains from about 50 to about 70 wt.% moisture, will spoil rapidly at ambient temperatures that may be as high as 37° C. (98° F.) while organ meat such as liver, heart and the like, as well as fish, will spoil even more rapidly than carcass meat unless refrigerated.

Accordingly, there is a need in zoos for fabricated foods which are completely balanced nutritionally, which are resistant to spoilage in storage and which can be used as a replacement for meat, fish and poultry in the feeding of carnivorous and omnivorous zoo animals. The food which is desired for use in feeding zoo animals is one which is neither a dry kibble nor an intermediate moisture food having a moisture content below about 30 wt.% and preserved with sugar and/or a humectant such as propylene glycol.

The fabricated zoo food should be of a semi-solid nature that can be readily and easily cut into suitably sized slices and pieces which maintain their integrity. Also, the fabricated foods must have sufficient bulk for the diet of the animal, be complete in the amino acid pattern including all essential amino acids, and have all of the requisite saturated and unsaturated fatty acids, minerals, trace minerals and vitamins. In addition, the fabricated zoo food should contain adequate moisture to meet the needs of pennipeds such as seals and sea lions as well as porpoises. The zoo food should have a texture which is comparable to the texture of bologna.

PRIOR ART

It is disclosed in the prior art that intermediate moisture pet foods can be formulated with stabilizing ingredients to provide shelf stable products which have improved characteristics with respect to moisture retention, bacterial resistance, antimycotic activity and textural stability.

U.S. Pat. No. 3,852,483 (Oborsh, 1974) discloses that intermediate moisture pet foods can be stabilized with an ingredient system comprising glyceryl monostearate and propylene glycol.

U.S. Pat. Nos. 3,962,462 (Burkwall, 1976) and 3,974,296 (Burkwall, 1976) disclose that intermediate moisture pet foods can be stabilized with an ingredient system comprising sugar or sugar equivalent, edible acid and an antimycotic. However, U.S. Pat. No. 3,974,296 cautions in column 6 at lines 15–20 that if too high of a moisture content is utilized, such as a moisture content above 40 percent by weight, then the product will become too mushy, will not be formable properly, and will unstable to bacteriological degradation.

SUMMARY OF THE INVENTION

In accordance with one aspect of this invention, there is provided a soft-moisture, heat treated, environmentally stable animal food product having a total moisture content from about 40 to about 60 wt.% and a pH from about 4 to about 6. The animal food product comprises from about 40 to about 65 wt.% of moist proteinaceous meaty material, from about 1 to about 14 wt.% of proteinaceous vegetable material, from about 8 to about 20 wt.% of added moisture and from about 0.75 to about 3.5 wt.% of colloidal clay. The product includes effective amounts of edible acid and antimicrobial material and the product may be further formulated with protein supplement material, fatty material, cellulosic binder, amylaceous material and palatability enhancing materials.

In a second aspect of this invention, there is provided a method for preparing a soft-moist, heat treated, environmentally stable animal food product having a total moisture content from about 40 to about 60 wt.%. The method of preparation comprises emulsifying and pasteurizing an ingredient mix containing from about 40 to about 65 wt.% of moist proteinaceous meaty material, from about 8 to about 20 wt.% of added moisture, from about 0.15 to about 3.5 wt.% of colloidal clay and acidified to a pH from about 4 to about 6. Pasteurization is advantageously effected at a temperature from about 160° to about 212° F. The ingredient mix includes effective amounts of edible acid and antimicrobial material and may be further formulated with protein supplement material, fatty material, cellulosic binder, amylaceous material and palatibility enhancing materials. Also, the emulsified and pasteurized animal food product may be anaerobically packaged.

DETAILED DESCRIPTION

A. Composition

The animal feed products of this invention are advantageously formulated to contain from about 15 to about 25 percent protein. Ingredients which can be used in the formulation to provide this protein level include moist proteinaceous meaty material, proteinaceous vegetable material, and optionally, protein supplement material.

The term "moist proteinaceous meaty material" as used herein includes carcass meat, organ meat, viscera, meat trim, low temperature rendered partially defatted fatty meat tissue, high temperature rendered partially defatted fatty meat tissue and the like as well as poultry, poultry parts, fish and fish products all as derived from sources well known to those in the art. The moist proteinaceous meaty material generally contains from about 50 to about 70% moisture and is present in the animal food products in an amount from about 40 to about 65 wt.%.

The term "proteinaceous vegetable material" as used herein applies to oil seeds and legumes as well as the oil-expressed or extracted meals and cakes and protein concentrates and isolates thereof. Typical of such vegetable protein sources are soybean, soybean meal, cotton seed meal, peanuts, peanut meal, flax seed and the like. Other proteinaceous vegetable materials include soy meal, soy flour and soy grits. The preferred vegetable protein is a soybean protein concentrate as, for example, soy flour which has been concentrated to provide in the flour at least 45 percent by weight of protein. In addition to adding nutritive value to the animal food products, the high protein flour also absorbs or binds water and provides an adhesive or binding function in the food products. The proteinaceous vegetable material is generally present in the animal food products in an amount from about 1 to about 14 wt.%.

Protein supplements may also be included in the animal food products in an amount from about 2 to about 10 wt.%. Examples of such protein supplements include meat meal, bone meal, fish meal, fish solubles, brewers dried yeast, dried skimmed milk, liquid whole egg and like materials.

Fatty material in the form of animal and vegetable fats and oils stabilized with antioxidants may advantageously be included in the animal food products. Examples of animal fats include suet, tallow and fish oils; and examples of vegetable oils include soy oil, corn oil and cotton seed oil. Fatty material may be present in the product in an amount from about 1 to about 8 wt.%.

Amylaceous ingredients can be added to the formulation in an amount up to about 10 wt.%. The term "amylaceous ingredients" refers to those foodstuffs containing a preponderance of starch and/or starch like material. Examples of amylaceous ingredients include cereal grains and means and flours obtained upon grinding cereal grains such as corn, oats, wheat, milo, barley, rye and the various milling by-products of these cereal grains such as wheat feed flour, wheat middlings, wheat mixed feed, wheat shorts, wheat red dog, oat groats, hominy feed and like material.

A cellulosic binder such as carboxy methyl cellulose and its derivatives or alginates may be used in the feed products in an amount from about 0.25 to about 0.75 wt.%. A particularly suitable cellulosic binder is sodium carboxy methyl cellulose (CMC). A palatibility enhancing sweetner may be included in the formulation in an amount up to about 20 wt.% to provide a product which is particularly suited for feeding omnivores such as bears. Examples of sweetners which may be used include molasses, honey, sugar and like materials.

Suitable vitamin and mineral mixtures including trace minerals are included in the formulation in appropriate amounts to further meet the nutritional requirements of the zoo animals.

Water is added to the formulation to provide the food product with a total moisture content from about 40 to about 60 wt.% and, preferably, from about 45 to about 55 wt%. The amount of added moisture in the formulation is generally from about 8 to about 20 wt.%.

In addition to the water binding properties resulting from the use of a high protein binding material as, for example, high protein soy flour, the animal food product is provided with a stabilizing system for further binding free water and resisting microbiological degradation, which comprises colloidal clay, edible acid and antimicrobial material.

Any suitable colloidal clay having water binding properties can be used in the product. Examples of such clays include attapulgite, bentonite, kaolin or mixtures thereof. Colloidal clay is generally present in the product in an amount from about 0.75 to about 3.5 wt.%, with the particular amount for a specific product being determined by the formulation and the physical characteristics desired in such product.

In order to attain appropriate stability at ambient temperatures, the pH of the product is adjusted to be within the range from about 4 to about 6 and, preferably, from about 4.5 to about 5.5. Any edible acid or acid-containing substance may be employed to adjust the hydrogen ion concentration to the desired pH. The edible acids which may be utilized include inorganic acids such as phosphoric acid, sulfuric acid or hydrochloric acid and organic acids such as lactic acid, citric acid, acetic acid or tartaric acid. A preferred acid is phosphoric acid. The requisite pH can generally be attained by employing the edible acid at a concentration level up to about 2 wt.%.

Antimicrobial material is employed in the formulation in an amount up to about 0.5 wt.% to resist and inhibit bacterial, yeast and mold growth. Examples of antimicrobials which can be used include benzoic acid, sodium benzoate, propionic acid, sodium and calcium proprionates, sorbic acid, potassium and calcium sorbates, esters of the parabens (para-hydroxy benzoate) such as methyl and propyl parabens and parasept.

Additional supplements can be incorporated into the formulation. For example, the vitamin mixture can be supplemented with carrot powder and additional calcium can be supplied in the form of calcium compounds such as calcium sulfate and calcium carbonate. Also, other bulking agents such as beet pulp can be utilized in the formulation.

B. Method

The soft-moist, animal food products are prepared by adding the moist proteinaceous meaty material, water, edible acid and antimicrobial material to an emulsifier such as a silent cutter and effecting emulsification of this ingredient mixture while the mixture is being heated to a temperature from about 160° to about 212° F. or higher to destroy micro-organisms. The remaining ingredients in the formulation are then added to the hot emulsified material with continued emulsification and heating in the aforesaid temperature range. The remaining ingredients include the proteinaceous vegetable material and colloidal clay and other nutritionally balancing ingredients and special purpose additives such as protein supplement, amylaceous material, fatty material, cellulosic binder, vitamin and mineral mixtures and calcium supplement, salt, sweetner, bulking agent and the like.

Heating of the ingredient mix may be effected in any suitable manner as, for example, by direct heating or by using an emulsifier equipped with a heat exchange jacket. Following the addition of the last ingredient to the emulsifier, the composition is preferably maintained at a temperature from about 175° to about 185° F. for about 5 to about 15 minutes at which time the material is in the form of a thick liquid. The thick, semi-liquid material, which may be packaged in suitable plastic lined bags, sausage casings or other containers in accordance with conventional procedures, solidifies upon cooling to form a product which has a texture comparable to that of bologna. To further enhance stability, the viscous emulsion may be anaeroebically prackaged in suitable casings by employing a vacuum stuffer.

C. Examples

The following examples further illustrate the invention. The procedure which is employed to prepare the zoo food products having the formulations set out in the examples generally follows the procedure which is hereinabove set forth under the heading "Method."

EXAMPLE I

This example sets forth the formulation for a soft-moist zoo food embodying the stabilizing system of this invention and which is particularly adapted for use in feeding pinnipeds such as seals and sea lions as well as porpoises.

| Ingredients | Wt. % |
| --- | --- |
| Moist Proteinaceous Meaty Material | 60.38 |
| Water | 8.75 |
| Phosphoric Acid (85%) | 0.40 |
| Methyl Paraben | 0.09 |
| Propyl Paraben | 0.09 |
| Potassium Sorbate | 0.09 |
| Soy Flour (50% Protein) | 10.0 |
| Bentonite Clay | 3.00 |
| Meat and Bone Meal | 2.00 |
| Fish Meal | 6.50 |
| Calcium Sulfate | 0.35 |
| CMC (Na) | 0.50 |
| Vitamins and Trace Minerals | 0.85 |
| Sodium Chloride (Iodized) | 0.50 |
| Fish Solubles (Stabilized) | 5.00 |
| Tallow (Stabilized) | 1.00 |
| Fish Oil (Stabilized) | 0.50 |

EXAMPLE II

This example shows an alternative formulation for a soft-moist food which is adapted for use in feeding pinnipeds.

| Ingredients | Wt. % |
| --- | --- |
| Beef By-Products | 45.8 |
| Pork By-Products | 16.4 |
| Water | 12.1 |
| Phosphoric Acid (85%) | 1.0 |
| Methyl Paraben | 0.1 |
| Propyl Paraben | 0.1 |
| Sorbic Acid | 0.1 |
| Calcium Proprionate | 0.1 |
| Soy Flour (50% Protein) | 11.6 |
| Attapulgite Clay | 0.9 |
| Meat and Bone Meal | 3.6 |
| Fish Meal | 2.4 |
| Calcium Sulfate | 0.5 |
| Sodium Chloride (Iodized) | 0.5 |
| Fish Solubles (Stabilized) | 1.6 |
| Fish Oil (Stabilized) | 1.4 |
| Brewers Yeast | 1.0 |
| Vitamins and Trace Minerals | 0.8 |

EXAMPLE III

This example sets forth the formulation for a soft-moist zoo food which embodies the stabilizing system of this invention and which is particularly adapted for use in feeding carnivorous animals.

| Ingredients | Wt. % |
| --- | --- |
| Moist Proteinaceous Meaty Material | 46.75 |
| Water | 10.0 |
| Phosphoric Acid (85%) | 0.4 |
| Methyl Paraben | 0.1 |
| Propyl Paraben | 0.1 |
| Potassium Sorbate | 0.1 |
| Soy Flour (50% Protein) | 12.7 |
| Attapulgite Clay | 2.0 |
| Meat and Bone Meal | 5.0 |
| Fish Meal | 2.5 |
| Calcium Sulfate | 2.0 |
| CMC (Na) | 0.5 |
| Vitamins and Trace Minerals | 0.8 |
| NaCl (Iodized) | 0.45 |
| Ascorbic Acid | 0.05 |
| Monosodium Glutamate | 0.05 |
| Carrot Meal | 2.5 |
| Beet Pulp | 5.0 |
| Whole Liquid Egg | 4.0 |
| Tallow (Stabilized) | 5.0 |

Liquid whole egg is included in the formulation to provide the product with better nutritional balance and to aid the animals in having a glossy coat. Dried egg may be substituted for the liquid whole egg. The carrot meal used in this example is also a source of carbohydrate, fiber and vitamin A. Other amylaceous materials could be substituted for the beet pulp.

EXAMPLE IV

This example shows an alternative formulation for a soft-moist zoo food which is adapted for feeding carnivorous animals.

| Ingredients | Wt. % |
| --- | --- |
| Beef By-Products | 43.1 |
| Pork By-Products | 13.4 |
| Water | 19.1 |
| Phosphoric Acid (85%) | 1.0 |
| Methyl Paraben | 0.1 |
| Propyl Paraben | 0.1 |
| Sorbic Acid | 0.1 |
| Calcium Propionate | 0.1 |
| Soy Flour (50% Protein) | 11.14 |
| Attapulgite Clay | 0.86 |
| Meat and Bone Meal | 1.97 |
| NaCl (Iodized) | 0.48 |
| Brewers Yeast | 1.54 |
| Tallow (Stabilized) | 1.0 |
| CMC (Na) | 0.48 |
| Vitamins and Minerals | 0.83 |
| Dried Skimmed Milk | 2.7 |
| Calcium Sulfate | 2.0 |

EXAMPLE V

This example shows a soft-moist zoo food formulation modified to include dried blood which makes it particularly suitable for feeding felines such a tigers and jaguars. Fresh blood may be substituted for the dried blood with appropriate adjustment of the water content.

| Ingredients | Wt. % |
| --- | --- |
| Beef By-Products | 43.73 |
| Pork By-Products | 13.4 |
| Water | 17.0 |
| Phosphoric Acid (85%) | 1.0 |
| Methyl Paraben | 0.1 |
| Propyl Paraben | 0.1 |
| Sorbic Acid | 0.1 |
| Soy Flour (50% Protein) | 11.38 |
| Attapulgite Clay | 0.86 |
| NaCl (Iodized) | 0.48 |
| Brewers Yeast | 1.0 |
| Meat and Bone Meal | 1.91 |
| Dried Beef Blood | 1.91 |
| Tallow (Stabilized) | 1.0 |
| Vitamins and Minerals | 0.85 |
| CMC (Na) | 0.48 |
| Monosodium Glutamate | 2.7 |

-continued

| Ingredients | Wt. % |
|---|---|
| Calcium Sulfate | 2.0 |

EXAMPLE VI

This example shows a formulation for a soft-moist zoo food which is adapted for use in feeding omnivorous animals. The formulation includes molasses as a palatibility enhancing sweetner which makes the product particularly suitable for feeding bears. Amylaceous material is also included in the formulations.

| Ingredients | Wt. % |
|---|---|
| Moist Proteinaceous Meaty Material | 40.5 |
| Water | 10.0 |
| Phosphoric Acid (85%) | 1.0 |
| Methyl Paraben | 0.1 |
| Propyl Paraben | 0.1 |
| Potassium Sorbate | 0.1 |
| Soy Flour (50% Protein) | 9.35 |
| Bentonite Clay | 2.0 |
| Meat and Bone Meal | 1.75 |
| Fish Meal | 1.5 |
| Calcium Sulfate | 2.0 |
| CMC (Na) | 0.5 |
| Vitamins and Minerals | 0.05 |
| NaCl (Iodized) | 0.45 |
| Ascorbic Acid | 0.05 |
| Monosodium Glutamate | 0.05 |
| Carrot Meal | 2.5 |
| Beet Pulp | 1.5 |
| Whole Liquid Egg | 2.5 |
| Oat Groats | 4.0 |
| Molasses | 15.0 |
| Tallow (Stabilized) | 5.0 |

Since molasses is a liquid, it is advantageously added in the first phase of the emulsifying and heating process for preparation of the animal food as described hereinabove under the heading "Method." The meaty material which may be used in the formulation includes meat, meat trim, viscera, partially defatted fatty meat tissue, poultry and poultry by-products. Up to approximately one-fourth of these meaty materials may be replaced with fish and fish products. Fresh or dried blood can be included in the formulation to increase palatibility.

EXAMPLE VII

This example shows an alternative formulation for a soft-moist zoo food which is adapted for feeding omnivorous animals. In this example, bentonite is used as the water binding colloidal clay and amylaceous material is present in the form of wheat flour.

| Ingredients | Wt. % |
|---|---|
| Beef By-Products | 36.95 |
| Pork By-Products | 14.52 |
| Water | 19.3 |
| Phosphoric Acid (85%) | 1.0 |
| Sorbic Acid | 0.1 |
| Calcium Proprionate | 0.1 |
| Propyl Paraben | 0.1 |
| Methyl Paraben | 0.1 |
| Meats and Bone Meal | 3.8 |
| Bentonite | 0.88 |
| Monosodium Glutamate | 0.1 |
| NaCl (Iodized) | 0.54 |
| Vitamins and Minerals | 0.83 |
| Calcium Sulfate | 2.0 |

-continued

| Ingredients | Wt. % |
|---|---|
| Soy Flour (50% Protein) | 10.24 |
| Brewers Yeast | 1.0 |
| Wheat Flour | 2.0 |
| Molasses | 6.44 |

The animal feed products of this invention resist spoilage at ambient temperature even though the products are formulated to contain from 40 to 60 wt.% moisture. This resistance to spoilage is effected through a stabilizing system, as hereinabove described, which, amongst other things, inhibits spoilage by binding free water which is conducive to spoilage.

In view of the foregoing description and examples, it will become apparent to those of ordinary skill in the art that equivalent modifications thereof may be made without departing from the spirit and scope of this invention.

That which is claimed is:

1. A soft-moist, heat treated, microbially stable, animal food product comprising:
   from about 40 to about 65 wt.% of moist proteinaceous meaty material;
   from about 1 to about 14 wt.% of proteinaceous vegetable material;
   from about 0.75 to about 3.5 wt.% of colloidal clay;
   added moisture to provide the product with a total moisture content from about 40 to about 60 wt.%;
   edible acid to provide the product with a pH from about 4 to about 6; and
   an effective amount of antimicrobial material which in combination with the colloidal clay and edible acid microbially stabilizes the animal food.

2. The animal food product of claim 1 wherein the total moisture content is from about 45 to about 55 wt.% and the pH is from about 4.5 to about 5.5.

3. The animal food product of claim 1 wherein the proteinaceous vegetable material is a high protein flour.

4. The animal food product of claim 3 wherein the high protein flour is soy flour.

5. The animal food product of claim 1 wherein the colloidal clay is attapulgite, bentonite, kaolin or mixtures thereof.

6. The animal food product of claim 5 wherein the colloidal clay is attapulgite.

7. The animal food product of claim 1 which also includes from about 2 to about 10 wt.% of protein supplement material.

8. The animal food product of claim 1 which also includes from about 1 to about 8 wt.% of fatty material.

9. The animal food product of claim 1 which also includes a cellulosic binder in an amount from about 0.25 to about 0.75 wt.%.

10. The animal food product of claim 1 which also includes a palatibility enhancing sweetener in an amount up to about 20 wt.%.

11. The animal food product of claim 1 which also includes amylaceous material in an amount up to about 10 wt.%.

12. A method for preparing a soft-moist, heat treated, microbially stable, animal food product which comprises emulsifying and pasteurizing at a temperature of from about 160° to about 212° F. an ingredient mix containing:
   from about 40 to about 65 wt.% of moist proteinaceous meaty material;

from about 1 to about 14 wt.% of proteinaceous vegetable material;

from about 0.75 to about 3.5 wt.% of colloidal clay;

added moisture to provide the product with a total moisture content from about 40 to about 60 wt.%;

edible acid to provide the product with a pH from about 4 to about 6; and an effective amount of antimicrobial material which in combination with the colloidal clay and edible acid microbially stabilizes the animal food and maintaining the temperature from about 175° to about 185° F. for about 5 to about 15 minutes to form a thick liquid which solidifies upon cooling.

13. The method of claim 12 wherein the added moisture provides the product with a total moisture content from about 45 to about 55 wt.% and the edible acid provides the product with a pH from about 4.5 to about 5.5.

14. The method of claim 12 wherein the emulsified and pasteurized animal food product is anaerobically packaged.

15. The method of claim 12 wherein the proteinaceous vegetable material is a high protein flour.

16. The method of claim 15 wherein the high protein flour is soy flour.

17. The method of claim 12 wherein the colloidal clay is attapulgite, bentonite, kaolin or mixtures thereof.

18. The method of claim 17 wherein the colloidal clay is attapulgite.

19. The method of claim 17 wherein the colloidal clay is bentonite.

20. The method of claim 12 wherein the ingredient mix also includes from about 2 to about 10 wt.% of protein supplement material.

21. The method of claim 12 wherein the ingredient mix also includes a cellulosic binder in an amount from about 0.25 to about 0.75 wt.%.

22. The method of claim 12 wherein the ingredient mix also includes a palatibility enhancing sweetner in an amount up to about 20 wt.%.

23. The method of claim 12 wherein the ingredient mix also includes amylaceous material in an amount up to 10 wt.%.

24. The method of claim 12 wherein the edible acid is a mineral acid, an organic acid or mixtures thereof.

* * * * *